US006051311A

United States Patent [19]

Osaka

[11] Patent Number: 6,051,311

[45] Date of Patent: *Apr. 18, 2000

[54] ROLL OF LABEL CONTINUUM HAVING LAYERS ADHESIVELY ADHERED TO ONE ANOTHER

[75] Inventor: Shozo Osaka, Shijonawate, Japan

[73] Assignee: Petter Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/986,986

[22] Filed: Dec. 9, 1997

Related U.S. Application Data

[62] Division of application No. 08/529,827, Sep. 18, 1995, Pat. No. 5,855,722.

[30] Foreign Application Priority Data

Sep. 26, 1994 [JP] Japan ................................ 257486/94

[51] Int. Cl.[7] ................................ B32B 7/12

[52] U.S. Cl. ................................ 428/352; 428/40.1; 428/43; 428/77; 428/202

[58] Field of Search ................................ 428/43, 40, 41, 428/58, 77, 189, 202, 203, 352, 40.1, 355 R, 361

[56] References Cited

U.S. PATENT DOCUMENTS

| | | | |
|---|---|---|---|
| 4,488,922 | 12/1984 | Instance | 156/192 |
| 4,528,055 | 7/1985 | Hattemer | 156/247 |
| 4,690,720 | 9/1987 | Mack | 156/248 |
| 5,006,191 | 4/1991 | Schmidt | 156/268 |
| 5,201,976 | 4/1993 | Eastin | 156/152 |
| 5,391,249 | 2/1995 | Senft | 186/248 |
| 5,470,418 | 11/1995 | Instance . | |
| 5,507,901 | 4/1996 | Limina et al. . | |
| 5,518,762 | 5/1996 | Soltysiak et al. | 427/208 |

*Primary Examiner*—Merrick Dixon
*Attorney, Agent, or Firm*—Jordan and Hamburg LLP

[57] ABSTRACT

A roll of label continuum includes an elongated label substrate having opposite sides, a pressure-sensitive adhesive layer on one side of the substrate, labels on the opposite side of the substrate and a release layer extending over the labels. The release layer and the pressure-sensitive adhesive layer are disposed on the outer opposite sides of the label continuum such that when the label continuum is rolled up into a roll, the pressure-sensitive adhesive layer is temporarily adhered to the release layer, the pressure-sensitive adhesive layer being released from its temporary adherence to the release layer as the label continuum is unrolled from the roll.

8 Claims, 4 Drawing Sheets

ROLL OF LABEL CONTINUUM HAVING LAYERS ADHESIVELY ADHERED TO ONE ANOTHER

This is a division, of application Ser. No. 08/529/827, filed Sep. 18, 1995 now U.S. Pat. No. 5,855,722.

BACKGROUND OF THE INVENTION

1. Field of the Invention

The present invention relates to a label continuum formed of a plurality of continued labels and a producing method thereof and, in particular, the so-called non-separable type of label continuum with no release paper which is particularly suitable for e.g. price tag or bar-code labels and a producing method thereof.

2. Description of the Prior Art

As a so-called non-separable label with no release paper there has hitherto been a label with a delayed tack type of heat-active pressure-sensitive adhesive layer formed on the back of a heat-resistant polyethylene.

Such continuum of labels with a hot-melt type of pressure sensitive pressure-sensitive adhesive layer formed on one side thereof can be used in a rolled form without any release paper on the back side thereof. This is because such a label has no adhesiveness before pressure sensitivity is imparted by melting the sensitive layer. However, such prior art non-separable type label requires a large-scale producing device, which is inevitably expensive, and as the label's substrate is required to be heat-resistant such as polyester since it has to activate the adhesive agent and what is low in heat-resistance such as extremely thin tape-like label continuum can not be usable.

Further, the substrate is required to be safe against any of the components of the adhesive forming the adhesive layer, the width of selection being quite limited.

SUMMARY OF THE INVENTION

Therefore, the object of the present invention is to widen the range of selection for the label substrate and the pressure-sensitive adhesive layer and to provide a label continuum which can be produced in a variegated small lot fashion and a method of production thereof.

A first aspect of the present invention relates to a label continuum comprising a long label substrate, a pressure-sensitive adhesive layer transferred to the back of the label substrate and a release layer formed on the surface of the label substrate, and a label substrate is rolled up such that the release layer and the pressure-sensitive adhesive layer are temporarily stuck to each other. In the first aspect of the invention, since the label substrate is rolled up so that the release layer formed on the surface of the label substrate and the pressure-sensitive adhesive layer formed on the back thereof is temporarily stuck to each other, it can be unrolled with ease. According to the first aspect of the invention, the pressure-sensitive adhesive layer is formed by transferring onto the back of the label substrate, hence the pressure-sensitive adhesive layer can be formed on the surface of the label substrate at the room temperature. Therefore, when a label substrate is selected, it is all right even if it is an extremely thin tape relatively low in heat resistance and since the solvent or the like contained in the pressure-sensitive adhesive in emulsion form can be removed prior to transfer of the solvent etc. and the width of selection of the pressure-sensitive adhesive for formation of pressure-sensitive adhesive layer can be increased regardless of the properties of the label substrate. Further, as the label substrate may be selected a thermal paper or the like made to develop on heating, while as printer may be used any kind thereof by the use of a transfer foil which requires rather intensive heating.

In the first aspect of the invention, the heat-sensitive developing layer may be formed on the side opposite to the pressure-sensitive adhesive layer. In this invention, since the label substrate is formed on the side opposite to the pressure-sensitive adhesive layer, developing takes place on heating. According to this invention, the heat-sensitive developing layer is formed on the side opposite to the pressure-sensitive adhesive layer, hence printing can be done with relative ease by the use of thermal printer or the like.

In the first aspect of the invention, the release layer may as well be formed by printing or coating a release agent and/or printing ink. In this invention, since on the surface of the label substrate is formed a printing layer and on the surface of the printed layer is formed an adhesive layer, the rolled up label continuum is caused to unroll. According to this invention, the release layer is formed on the surface of the label substrate, unrolling is possible if the pressure-sensitive adhesive layer is formed on the back of the label substrate and the label substrate is rolled up with the adhesive layer formed on the surface thereof, these layers being temporarily stuck to each other and the labels can be cut piecewise for use.

In the first aspect of the invention, the release layer on the surface of the label substrate is formed of film or sheet excelled in releasability. In this invention, since the release layer is formed on the label substrate, it can be unrolled with ease. According to this invention, unrolling is possible if the label substrate is rolled up with the release layer on the surface of the label substrate and the pressure-sensitive adhesive layer on the back thereof temporarily stuck to each other, and individual labels may be cut piecewise for use.

A second aspect of the invention relates to a producing method of label continuum comprising a step 1 of preparing a process sheet having a releasable surface and forming a pressure-sensitive adhesive layer on the process sheet's releasable surface, a step 2 of preparing a long label substrate with its back the pressure-sensitive adhesive layer is to be transferred and stuck to and of applying the process sheet's pressure-sensitive adhesive layer to the back of the label substrate, a step 3 of forming a release layer on the surface of the label substrate, a step 4 of releasing only the process sheet from the surface of the pressure-sensitive adhesive layer transferred to the back of the label substrate and a step 5 of rolling up the label substrate so that the release layer and the pressure-sensitive layer are temporarily stuck to each other. In the second aspect of the invention, the label substrate is rolled up with its release layer side and the pressure-sensitive adhesive layer side are temporarily stuck to each other, hence the rolled up label continuum is unrolled with ease. According to the second aspect of the invention, the pressure-sensitive adhesive layer formed on the surface of the process sheet having releasability and the surface of the long label substrate to which the pressure-sensitive adhesive layer is transferred and stuck are pressed together and the pressure-sensitive adhesive layer is transferred from the process sheet's surface to the back of the long label substrate at room temperature, hence even if the label substrate is relatively low in heat resistance and extremely thin, an adhesive layer can be formed. Also, since the solvent contained in the pressure-sensitive agent for formation of a pressure-sensitive adhesive layer is removed when the pressure-sensitive adhesive agent is in emulsion form, there is no risk of solvent or the like affecting the label substrate. Therefore, the width of selection for the label substrates and pressure-sensitive adhesive agents for formation of the adhesive layers is by far greater and this is suited for variegated small lot production. The process sheet can be reused many times over, this being advantageous for reuse of resources as well as for dust saving.

In the second aspect of the invention, the step 4 may include a step of slitting in a desired width the label substrate, process sheet laminated in the steps 1–3 with the other layers formed. In this invention the process sheet and the long label substrate are slit together with the other layers formed. According to this invention, a wide and long label substrate and a process sheet are prepared, these are laid one upon the other by means of pressure-sensitive adhesive layer and the label substrates are slitted in a desired width. In this way, the pressure-sensitive adhesive layer formed on the surface of the process sheet having releasability with minor waste parts along both sides of the process sheet and increased formation of label substrate of the predetermined, width, this being very useful.

In the second aspect of the invention, the step 4 may possibly include the step of die-cutting the label substrate laminated in the steps 1–3 together with other layers in the predetermined width. In this invention, the process sheet is not cut and the label substrare is cut with other layers. According to this invention, the wide and long label substrate and the process sheet are prepared, these are rolled up using pressure-sensitive adhesive layer and by die-cutting the label substrate in a desired width for formation of a desired label width, the predetermined labels can be formed, this being very useful.

In the second aspect of the invention, the step 3 may include a step of printing or coating a printing ink excelled in releasability on the surface of the label substrate to thus form a release layer. In this invention, since the label substrate is rolled up for its release layer side and pressure-sensitive adhesive layer side to be false-stuck to each other, the rolled up label continuum is caused to unroll. According to this invention, the pressure-sensitive adhesive layer is formed on the release surface of the process sheet, and when it is mated with the back of the long label substrate bonded through transfer of the pressure-sensitive adhesive layer, it is possible to transfer the pressure-sensitive adhesive layer from the process sheet to the back of the long label substrate through the action of the release agent and/or the printing ink excelled in releasability.

In the second aspect of the invention, the step 3 may include a step of laminating film or sheet for formation of release layer excelled in releasability on the surface of the label substrate. In this invention, since the label substrate is rolled up so that the release layer side the the pressure-sensitive adhesive layer side of the label substrate are temporarily stuck to each other, the rolled up label continuum is caused to unroll. According to this invention, the pressure-sensitive adhesive layer is formed on the release surface of the process sheet and when it is mated with the back of the long label substrate to which the pressure-sensitive adhesive layer is transferred and stuck, it is possible to have the heat-sensitive adhesive layer from the process sheet to the long label substrate by the action of the film or sheet excelled in releasability.

The aforementioned objects, other objects, features, phases and advantages will become further apparent from reading the detailed description of the embodiments with reference to the drawings.

DESCRIPTION OF THE PREFERRED EMBODIMENTS

Figure 1A:
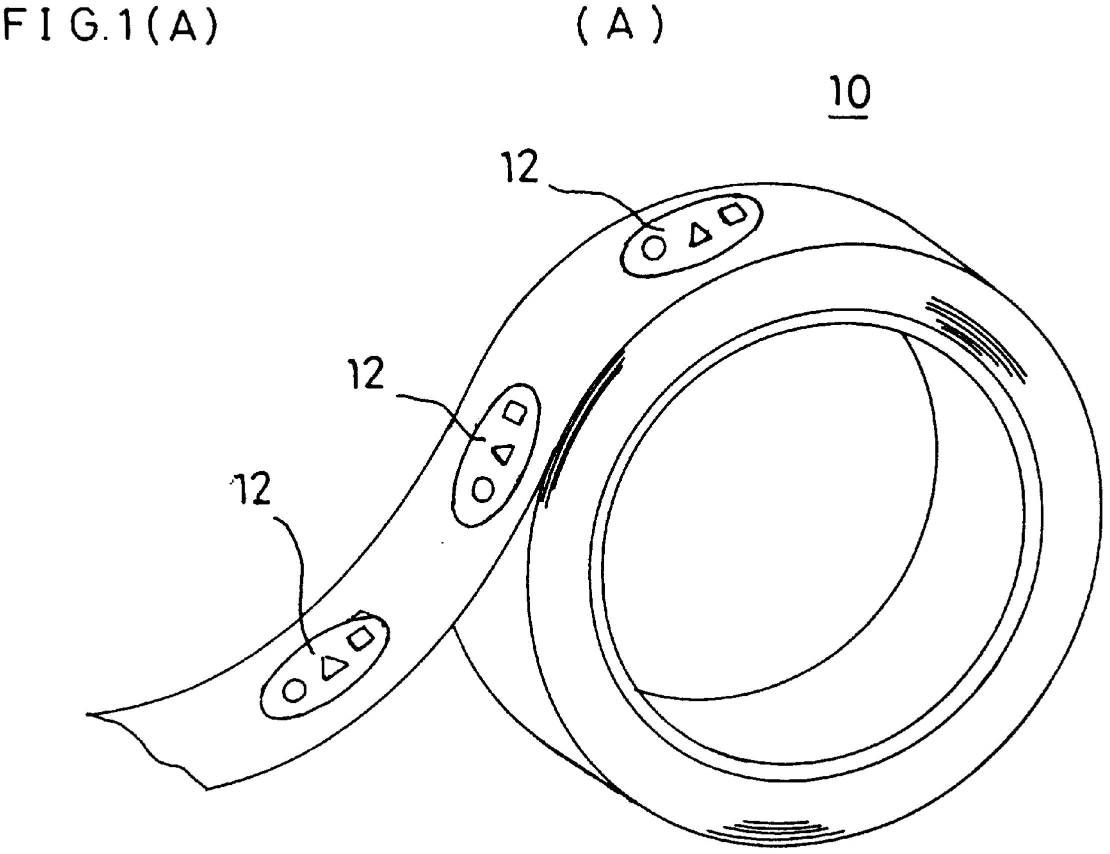
FIG. 1 is an illustratory view showing an embodiment of the present invention relating to a label continuum, of which (A) is a perspective view and (B) is a sectional view.
Figure 1B:
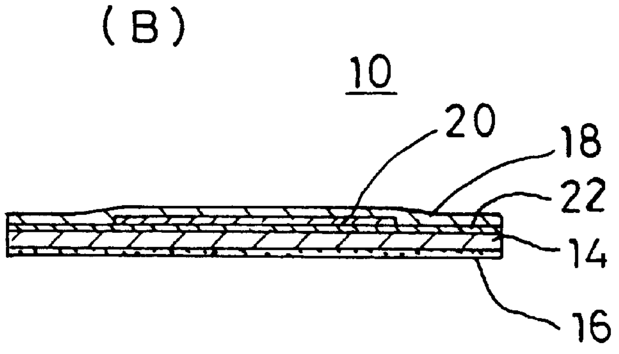

FIG. 1 is a illustratory view showing an embodiment of the present invention relating to a label continuum, of which (A) is a perspective view and (B) is a sectional view.

Figure 2:
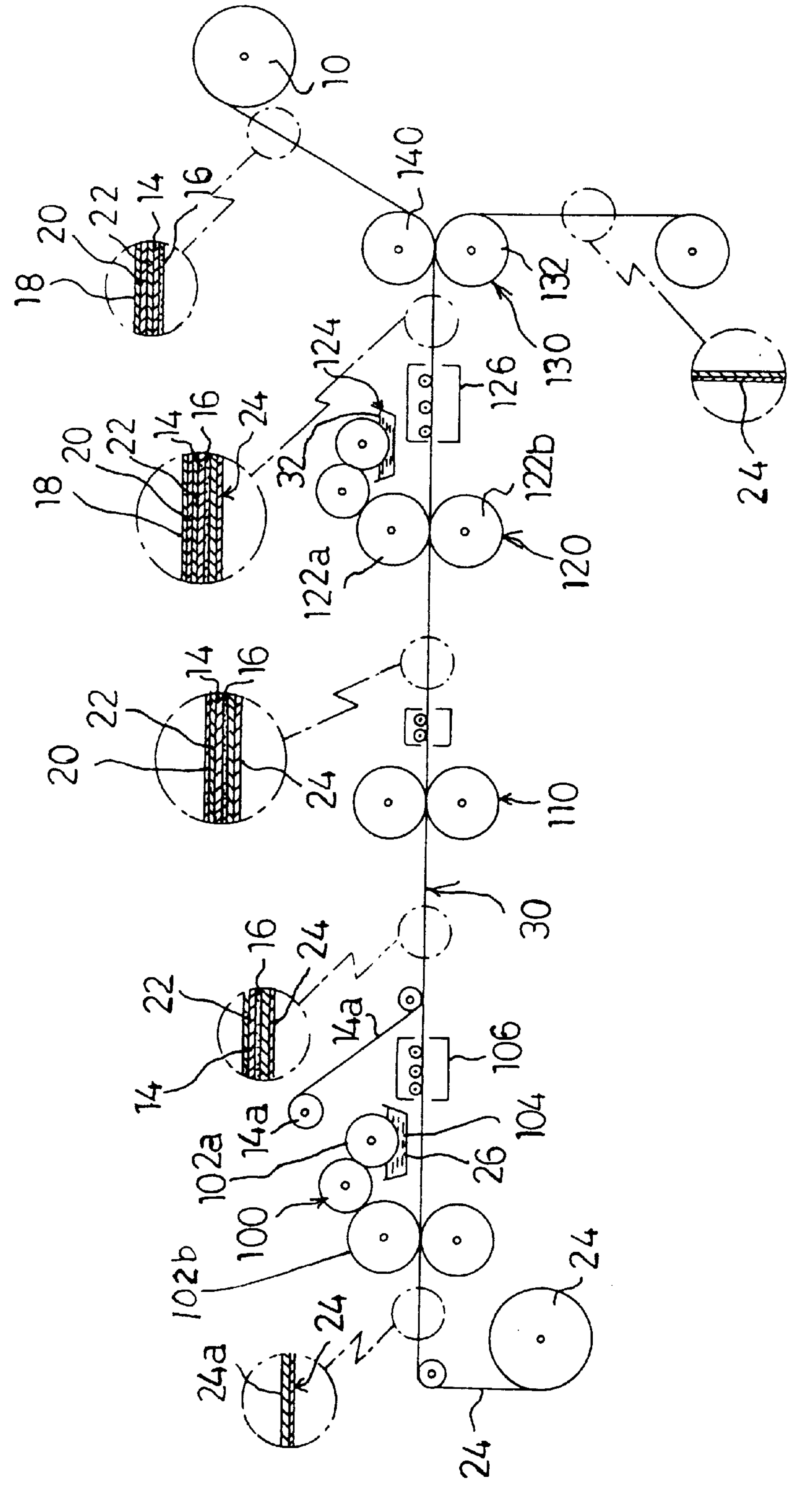
FIG. 2 is an illustratory view showing an example of the method of producing what is shown in FIG. 1.

FIG. 2 is an illustratory view showing an example of producing method of what is shown in FIG. 1.

A label continuum 10 is an embodiment of the invention, forming as a belt-like repetition of a plurality of labels 12, each label 12 is separated by cutting along the border line therebetween.

There is formed on the back of a long label substrate 14 a pressure-sensitive adhesive layer 16 transferred thereto, a release layer 18 is formed on the surface of the label substrate 14 and a printed layer 20 is formed in a part of the surface of the label substrate 14.

The printed layer 20 is formed intermittently, i.e. with the predetermined spaces between the expressions of adjacent labels 12 having border line therebetween.

As shown in FIG. 1 (A), the label substrate 14 of the label continuum 10 is rolled up such that the release layer 18 and the pressure-sensitive adhesive layer 16 are temporarily stuck to each other prior to use as labels.

In this embodiment, a heat-sensitive developing layer 22 is formed on the release layer 18 side's surface of the label substrate 14.

The long label substrate 14 in this embodiment is made of, for example, paper, synthetic paper, plastic film or sheet such as cellophane, polystyrene and polyester or aluminum foil. In order to cut the long belt type of label continuum without seams between the individual labels 12, however, such material is required to be cut by hand or proper machine such as a cutter. It is also possible to provide seams at the predetermined intervals (not shown) for cutting off each label 12.

The pressure-sensitive 16 formed by application of a pressure-sensitive adhesive agent to the back of the label substrate 14 is for imparting adhesive force to each label 12 and for this purpose known pressure-sensitive adhesive agents such as of acrylic copolymer or rubber-type adhesive agent are used.

The heat-sensitive developing layer 22 is formed on the surface of the label substrate 14 by coating and drying a heat-sensitive developing agents including a mixture of e.g. transparent or single-color leuco-dyes, acid substances and binders. As leuco dyes may be cited, among others, crystal violet lactone, 3-indolino-3-P-dimethylaminophenyl-6-dimethylaminophthalid, 3-diethylamino-7-chlorofluoran, 2-diethylamino-7-cyclohexylaminofluoran, 3-diethylamino-5-methyl-7-t-buthylfluoran, 3-diethylamino-6-methyl-7-anilinofluoran, and 3-diethylamino-6-methyl-7-P-butylanilinofluoran.

As acid substances may be cited, among others, 2,2-bis (4'-oxyphenyl) propane, 4-phenylphenol, 4-hydroxyacetophenone, 2,2'-dihydroxydiphenyl, 2,2'-methylene bis (4-methyl-6-t-buthylphenol), 4,4'-isopropylidene-diphenol, 4,4'-isopropyridene bis (2-chlorphenol), 4,4'-isopylidene bis (2-methylphenol), 4,4'-ethylene bis (2-methylphenol) and 4,4'-thiobis (6-t-buthyl-3-methylphenol).

As binders may be cited, for example, aqueous solution or emulsion of polyvinyl alcohol, methoxy cellulose, hydroxyethyl cellulose, carboxymethyl cellulose, polyacrylamide, polyacrylic acid, starch, gelatin, polystyrene, vinyl acetate copolymer.

The heat-sensitive developing layer 22 is developed when heated by the thermal head of a printer and the like.

On the surface of the heat-sensitive developing layer 22 side of the label substrate 14, the printed layer 20 is formed for expression of the individual labels 12 at the predetermined intervals with the border lines therebetween. This printed layer 20 is formed using a general printing ink by a known printing method such as planographic printing, relief printing or offset printing.

The release layer 18 on the surface of the label substrate 14 over the heat-sensitive developing layer 22 and the printed layer 20 is formed by printing or coating silicone resin which, for instance, can be cured without affecting the heat-sensitive developing layer 22.

In this embodiment, may preferably be selected as the release agent constituting the release layer 18 UV silicone (the so-called silicone of the UV-curing type) and EB silicone (the so-called silicone of the electronic ray curing type) being cured by UV or electronic ray without affecting the heat-sensitive developing layer 22.

Then, an example of the producing method shown in FIG. 1 will be described with reference mainly to FIG. 2.

First, a rolled up long belt-like process sheet 24 made of rolled paper, plastic film or sheet is provided. This process sheet 24 is used only in the production process and is no longer included in the finished label continuum 10. On the surface of the process sheet 24 is formed a release layer 24*a* made by printing or coating a release agent such as silicone resin or fluorine resin.

Then, a pressure-sensitive adhesive agent 26 for formation of the pressure-sensitive adhesive layer 16 is printed or coated on the surface of the release layer 24*a* of the process sheet 24. An adhesive agent coating device 100 includes a plurality of rollers 102*a* and 102*b*. The roller 102*a* has its lower part dipped in the pressure-sensitive adhesive agent 26 in a pan 104.

Hence, by rotating the roller 102*a* and 102*b*, the pressure-sensitive adhesive agent 26 is printed or coated on the surface of the release layer 24*a* of the process sheet 24 led to the position.

As adhesive agent coating device may as well be used a gravure roll coater, reverse roll coater or air knife coater and a known printing machine such as a screen printing machine may also be used.

The process sheet 24 printed or coated with the pressure-sensitive adhesive layer 26 may be led to a dryer 106 including, for instance, a heater. In the dryer 106, the pressure-sensitive adhesive agent 26 printed or coated on the process sheet 24 is dried for formation of a pressure-sensitive adhesive layer 16. When as pressure-sensitive adhesive agents 26 those containing water soluble resins such as of EVA type, vinyl acetate type or acryl type or those of solvent type comprising polyvinyl chloride, urethane and acryl, a dryer is used for enhancing evaporation of water or solvent, while a cooler is to be used when the adhesive agent used is of the hot melt type such as of rubber type or EVA type.

On the release layer 24*a* of the process sheet 24 printed or coated with a pressure-sensitive adhesive agent 26, the paper 14*a* is laminated to form label substrate 14.

The paper 14*a* of the label substrate 14, too, is formed in the same width as that of the process sheet 24 and on the surface of the paper 14a as the label substrate 14 the heat-sensitive developing layer 22 is already formed.

The heat-sensitive developing layer 22 is formed on the side opposite to the aforementioned adhesive layer 26.

The continuums of the process sheet 24 and the label substrate 14 are laminated and temporarily stuck to each other with a layer of a pressure-sensitive adhesive layer 26, and the resulting laminate 30 is led to the next step of printing and release agent coating device shown in FIG. 2.

Then, the laminate 30 is led to the printing device 110 for formation of the printed layer 20 shown in FIG. 2. This printing device 110 is for printing the expression constituting each label 12, for instance, letters such as trade name, proper patterns etc. by a known printing device for planographic printing, relief printing or offset printing.

The laminate 30 with the printed layer 20 thereon is then led to a release coating device 120 for formation of the coating agent 18 on the surface of the release layer 20 on the label substrate 14. This release agent coating device 120 is made up of a main roller 122*a* and a roller 122*b* opposite thereto. The main roller 122*a* has its lower part dipped in a dissolved release agent 32 in a pan and the release agent 32 is coated by the main roller 122*a* on the surface of the label substrate 14 of the laminate 30 passing through between the main roller 122*a* and the roller 122*b*.

The laminate 30 printed or coated with the release agent 32 is moved to the dryer 126 including e.g. a heater. In the dryer 126, the release agent 32 printed or coated on the laminate 30 is dried and the release layer 18 is formed. The label continuum 10 made up of the release layer 18 and the laminate 30 is then led to a process sheet removing device 130. This process sheet removing device 130 includes a roller 132 and peel the process sheet 24 off from the surface of the pressure-sensitive adhesive layer 16 of the laminate 30 and the peeled process sheet 24 is rolled up for reuse.

Meanwhile, the laminate 30 constituting the label continuum 10 is rolled up with its both sides or either side being die-cut by a die-cutter 140 together with other printed layer 20, heat-sensitive developing layer 22, release layer 18 and pressure-sensitive adhesive layer 16 to make the width of the label continuum 10 optimum.

The die-cutting performance of the die-cutter 140 is so adjusted that the process sheet 24 is not cut or intact with its width unaltered and the pressure-sensitive adhesive layer 16 being transferred to the label substrate 14, hence it is reusable as the process sheet 24.

Figure 3:
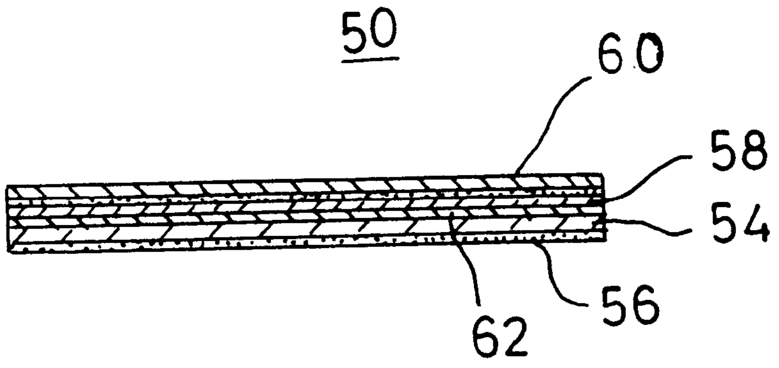
FIG. 3 is a sectional view of a label continuum as another embodiment of the invention.

Now, another embodiment of the invention relating to the label continuum shown in FIG. 3 instead of FIG. 1 will be will be explained. FIG. 3 is a sectional view of the label continuum in another embodiment and FIG. 4 is an illustratory view showing an example of the producing method of the embodiment shown in FIG. 3.

This label continuum 50 has formed a printed layer 58 on the surface of the label substrate 54, being thus different from that shown in FIG. 1. Further, a release layer 60 of transparent film or sheet excelled in releasability is formed on the surface of the printed layer 58. It is same as what is shown in FIG. 1 that a pressure-sensitive adhesive layer 56 is formed on the back of the label substrate 54 and that a heat-sensitive developing layer 62 is formed on the surface of the label substrate 54.

As to the label continuum 50 shown in FIG. 3, a laminate 70 of the label substitute 54 and a process sheet 64 for the first half of the production process is produced by the same device as shown in FIG. 3. The production system for the second half of the production process as shown in FIG. 4 is constituted to form the printed layer 58 on the surface of the heat-sensitive developing layer 62 by a printing device 210 but instead of forming a release layer by printing or coating the release agent to the surface of the label substrate of laminates by means of a release agent coater rolling a transparent or translucent film 60*a* forming the release layer 60, it is so arranged that forming an adhesive layer 60*b* on the back of the film 60*a* and having the film 60*a* stuck to the surface of the printed layer 60 by the adhesive force of the adhesive layer 60*b*.

Figure 4:
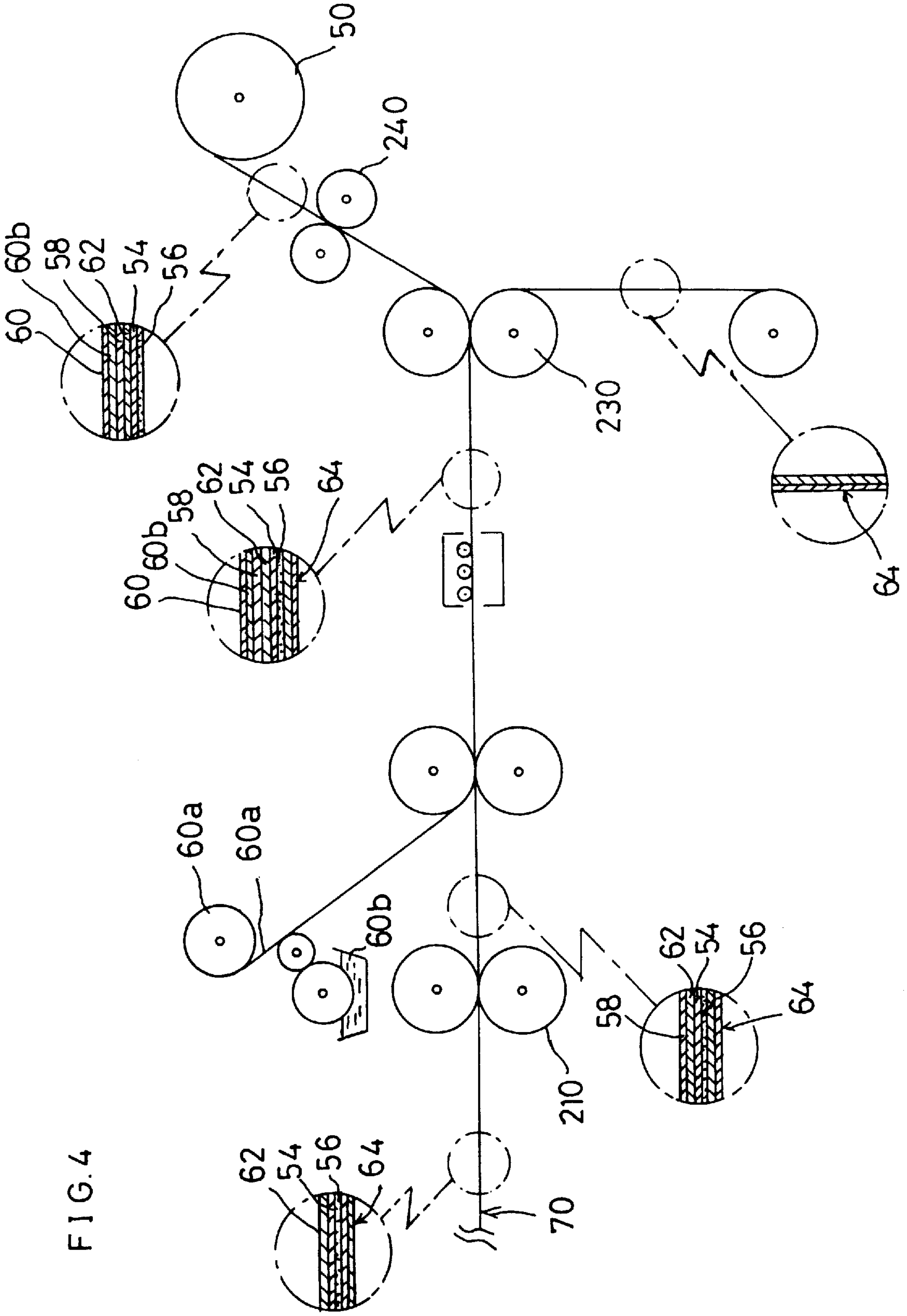
FIG. 4 is an illustratory view showing an example of the producing method shown in FIG. 3.

In the example shown in FIG. 4, different from that shown in FIG. 2, the slitter 240 for adjusting the width of the label 54 to the optimum width of the label continuum 50 is located further downstream than immediately before rolling up so that the process sheet 64 is peeled off from the pressure-sensitive adhesive layer 56 by the process sheet removing device 230.

By the way, this invention is by no means limited by the given embodiments and various modifications are possible. For example, in the embodiment shown in FIG. 1, the printed layer also acting as release layer may be formed on the surface of the release layer good only for the purpose. In that case, however, it is necessary to select a printing ink having itself release effect.

Having described our invention as elated to the embodiment shown in the accompanying drawing, it is our intention that the invention be not limited by any of the details of description, unless otherwise specified, but rather be construed broadly within its spirit and scope as set out in the accompanying claims.

What is claimed is:

1. A roll of label continuum comprising:

an elongated label substrate having opposite sides;

a pressure-sensitive adhesive layer applied to one side of said substrate;

labels on the opposite side of said substrate;

a release layer extending over said labels;

said release layer and said pressure-sensitive adhesive layer being disposed on the outer opposite sides of the label continuum such that when the label continuum is rolled up into a roll, the pressure-sensitive adhesive layer is temporarily adhered to said release layer;

said pressure-sensitive adhesive layer being released from said temporary adherence to said release layer as said label continuum is unrolled from said roll.

2. A roll of label continuum according to claim 1 further comprising a heat-sensitive developing layer applied to the other side of said substrate.

3. A roll of label continuum according to claim 2 wherein said labels are disposed between said heat-sensitive developing layer and said release layer.

4. A roll of label continuum according to claim 2 wherein said labels on said heat-sensitive developing layer are spaced from one another to provide spaced sections of said heat-sensitive developing layer between said spaced labels, said release layer being applied to said spaced labels and to said spaced sections of said heat-sensitive developing layer between said spaced labels.

5. A roll of label continuum according to claim 1 wherein the pressure-sensitive adhesive layer and the release layer are continuous layers extending the length of the roll of the label continuum.

6. A roll of label continuum comprising:

an elongated label substrate having opposite sides;

an adhesive layer applied to one side of said substrate;

a printed label layer on the opposite side of said substrate;

a release layer extending over said printed label layer;

said release layer and said adhesive layer being disposed on the outer opposite sides of the label continuum such that when the label continuum is rolled into a roll, the pressure-sensitive adhesive layer is temporarily adhered to said release layer in said roll;

said pressure-sensitive adhesive layer being released from said temporary adherence to said release layer as said label continuum is unrolled from said roll.

7. A roll of label continuum according to claim 6 wherein said release layer comprises a film and an adhesive coating adhered to said film, said adhesive coating adhering said film to said printed label layer.

8. A roll of label continuum according to claim 7 further comprising a heat-sensitive development layer between said printed label layer and said adhesive coating.

* * * * *